United States Patent Office
3,840,609
Patented Oct. 8, 1974

3,840,609
PROCESS FOR THE PREPARATION OF ALKYL TETRAHYDRONAPHTHALENE
Isao Oka, Takanori Urasaki, Takeo Shima, and Wataru Funakoshi, Iwakuni, Japan, assignors to Teijin Limited, Osaka, Japan
No Drawing. Filed Aug. 28, 1972, Ser. No. 284,044
Claims priority, application Japan, Aug. 31, 1971, 46/66,884
Int. Cl. C07c 15/24
U.S. Cl. 260—668 F                 9 Claims

ABSTRACT OF THE DISCLOSURE

A process for preparing alkyl Tetralins by cyclizing the alkenyl benzenes, the cyclization being accomplished by contacting the alkenyl benzenes with a solid phosphoric acid catalyst at a temperature of 180–350° C.

---

This invention relates to a process for the preparation of alkyl Tetralins. The alkyl Tetralins are especially valuable as starting materials for the preparation of naphthalenedicarboxylic acids, which latter are used as the dicarboxylic acid constituent for the formation of a certain class of polyester. For instance, 1,5 (or 1,7)-dimethylnaphthalene is prepared by the dehydrogenation of 1,5 (or 1,7)-dimethyl-Tetralin, and by the isomerization and oxidation of the so prepared 1,5 (or 1,7)-dimethylnaphthalene, naphthalene-2,6 (or 2,7)-dicarboxylic acid is obtained.

A conventional method of preparing the alkyl Tetralins is disclosed in U.S. Pat. 3,244,758. According to this patent, the cyclization reaction is carried out by contacting 5-(o- or p-tolyl)-2-pentene with an acidic catalyst such as $H_2SO_4$, HF, silica-alumina or silica-magnesia. It is further disclosed in this patent that while the cyclization reaction will take at a temperature ranging from 0° C. to a relatively high temperature, say, of 300° C., actually preferred is the employment of room temperature. Again, it states that undesirable side reactions such as isomerization and dealkylation also take place in the case of reactions in the elevated temperature range, and hence that it is undesirable to employ elevated temperatures.

However, of these catalysts of the foregoing patent, the acidic catalysts such as $H_2SO_4$ and HF are not only highly corrosive, but also in obtaining the intended alkyl Tetralins in good yield by the use of such catalyst, it becomes necessary to use a solvent and moreover carry out the reaction at about room temperature. Hence, there arises the necessity for a troublesome operation of separating the reaction product from the solvent and the catalyst. On the other hand, the use of the solid catalyst such as silica-alumina and silica-magnesia is desirable from the standpoint of the separation of the catalyst from the reaction product, but in this case the reaction properties, i.e., the yield and selectivity of reaction, are considerably inferior. That is to say, when the cyclization reaction of the alkenyl benzene is carried out using such solid acidic catalyst, undesirable side reactions such as the shifting of the double bond of the alkenyl benzenes used as the starting material and the shifting of the alkyl group of the alkyl Tetralins, the reaction product, are set up, with the consequence that the yield of the intended alkyl Tetralins declines.

With a view to overcoming such shortcomings as noted above, we engaged in extensive research and, as a result, found that the alkyl Tetralins could be obtained in good yield and with less side reactions by using the solid phosphoric acid catalyst and carrying out the reaction at preferably an elevated temperature close to 300° C. Thus, the present invention was perfected.

Accordingly, the present invention is directed to a process for the preparation of alkyl Tetralins which comprises effecting the cyclization of an alkenyl benzene of the formula

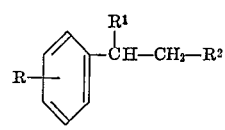

wherein R is hydrogen or an alkyl group of 1–2 carbon atoms, $R^1$ is hydrogen or a methyl group and $R^2$ is either —CH=CH—$CH_3$, —$CH_2$—CH=$CH_2$,

or —$CH_2$—CH=CH—$CH_3$, by contacting said alkenyl benzene with a solid phosphoric acid at a temperature of 180–350° C.

The alkenyl benzenes having the foregoing formula and useable in the present invention include, for example, 5-phenyl-2-pentene, 5-(o-tolyl)-2-pentene, 5-(p-tolyl)-2-pentene, 5-(m-tolyl)-2-pentene, 5-phenyl-1-pentene, 5-(o-tolyl)-1-pentene, 5-(p-tolyl)-1-pentene, 5-(m-tolyl)-1-pentene, 5-methyl-5-phenyl-2-pentene, 5-methyl-5-phenyl-1-pentene, 5-methyl-5-(o-ethylphenyl)-2-pentene, 5-methyl-5-(o-ethylphenyl)-1-pentene, 5-methyl-5-(p-tolyl)-2-pentene, 6-(o-tolyl)-3-hexene, 6-(o-tolyl)-2-hexene, 6-methyl-6-phenyl-3-hexene, 6-methyl-6-phenyl-2-hexene and 6-phenyl-3-hexene.

According to the invention process, the corresponding alkyl Tetralins are obtained in good yield from the alkenyl benzenes. For instance, 1-methyl-Tetralin is obtained from 5-phenyl-2-pentene, 1,5-dimethyl-Tetralin is obtained from 5-(o-tolyl)-2-pentene, 1,7-dimethyl-Tetralin is obtained from 5-(p-tolyl)-2-pentene. 1,6-dimethyl-Tetralin and 1,8-dimethyl-Tetralin are obtained from 5-(m-tolyl)-2-pentene, 1-methyl-Tetralin is obtained from 5-phenyl-1-pentene, 1,4-dimethyl-Tetralin is obtained from 5-methyl-5-phenyl-2-pentene, and 5-methyl-1-ethyl-Tetralin is obtained from 6-(o-tolyl)-3-hexene.

In accordance with the invention, there is only the remotest possibility of the resulting intended alkyl Tetralin being further isomerized by the cyclization reaction catalyst to form such isomers of said alkyl Tetralin which are very difficult to isolate therefrom. Hence, for example, 1,5-dimethyl-Tetralin or 1,7-dimethyl-Tetralin of high purity can be obtained from 5-(o- or p-tolyl)-2-pentene. When the alkyl Tetralins such as these are dehydrogenated and isomerized, they can be converted to 2,6-dimethylnaphthalene or 2,7-dimethylnaphthalene of high purity. In contrast, in the case where 1,5-dimethyl-Tetralin, which is adulterated with its isomers such as 1,7-dimethyl-Tetralin or 1,8-dimethyl-Tetralin, is dehydrogenated and isomerized, there is obtained a mixture of 2,6-dimethylnaphthalene and 2,7-dimethylnaphthalene, compounds that are difficult to separate from each other. Hence, difficulties are experienced in obtaining commercially and advantageously 2,6-dimethylnaphthalene of high purity. As described above, such difficulties can be avoided by the present invention.

The cyclization catalyst used in the invention process is a solid phosphoric acid.

The term "solid phosphoric acid," as here used, as is well known, denotes a catalyst which consists of predominantly phosphoric acid supported on a siliceous absorbent. And the term "phosphoric acid," as here used, is meant to be orthophosphoric acid, pyrophosphoric acid, and the polyphosphoric acids such as triphosphoric acid, tetraphosphoric acid and hexaphosphoric acid, as well as the mixture thereof. Preferred as the carrier are, for example, diatomaceous earth, Celite, bentonite, silica, acid clays and montmorillonite.

The solid phosphoric acid catalyst is prepared, for instance, by mixing orthophosphoric acid or its polymer with a suitable amount of a carrier and then heat treating the mixture. The heat treatment is carried out at, say, a temperature ranging from 150 to 800° C.

The solid phosphoric acid catalyst used in the invention process can also be incorporated with a minor proportion of an assistant catalyst, useable being the oxides and phosphates of nickel or copper, ammonium phosphate, the alkali metal salts of phosphoric acid and sulfuric acid, ammonium sulfate and aluminum sulfate.

The solid phosphoric acid catalyst is described in, e.g., U.S. Pats. 2,694,686, 2,833,727, 2,826,622, 3,248,452 and 2,778,804.

The content of phosphoric acid of the solid phosphoric acid catalyst used in the invention process is indicated by its content of phosphorus pentoxide ($P_2O_5$). While there is no particular restriction as to this amount, those in which the content is 10–90% by weight, and preferably 30–70% by weight, are used.

The particle size of the catalyst in the invention process will vary depending upon the type of reaction apparatus used, but usually preferred is the use of a catalyst having a particle size of 0.0001 to 20 millimeters. More specifically, those of a particle size of 1–10 millimeters are especially preferred when using a fixed bed reactor. On the other hand, those having a particle size of 0.005–0.5 millimeter are especially preferred in the case where the suspension phase is used.

The cyclization reaction can be carried out by contacting the alkenyl benzene with the solid phosphoric acid catalyst at a temperature of 180–350° C. in a liquid or gaseous state.

First, a mode in which the starting material is reacted in the liquid state will be described.

When contact of the alkenyl benzene with the solid phosphoric acid catalyst is had in its liquid state, the contact is carried out preferably at a temperature of 180–300° C., and especially 200–300° C. While the cyclization reaction does proceed even at temperatures less than 180° C., for achieving the high yield that is intended by the present invention it is necessary to carry out the reaction at the temperatures indicated above. At elevated temperatures undesirable side reactions due to the reaction of the starting material as well as the intended product are set up, with the consequence that the yield of the intended product declines.

The amount used of the solid phosphoric acid catalyst, base don the starting alkenyl benzene, varies depending upon the particle size of the solid phosphoric acid catalyst. The amount used is preferably a value (hereinafter referred to as F value) of 0.04–200 mm. hr.$^{-1}$, which value is expressed by the rationship:

$F=$ (Weight of alkenyl benzene fed per unit operation time) $\times$ (Particle diameter)/(Weight of catalyst)

When the amount of catalyst used is less than the amount indicated by the preferred F value as indicated by the foregoing relationship, the yield is poor even though the reaction mixture is repeatedly contacted with the catalyst in an attempt to attain the intended yield. On the other hand, when the amount used exceeds the aforesaid F value, this also is undesirable, since there is rather a tendency of the yield to decline. As an especially desirable amount in which to use the catalyst in accordance with the invention in relation to the starting alkenyl benzene, an amount such that the F value becomes 0.20–30 mm. hr.$^{-1}$ is chosen and used at a reaction temperature of 180–300° C. It is also possible to prepare in good yield the intended alkyl tetralins by a single-pass operation without circulating the starting material by the choice of such conditions as described above.

While the invention process permits the cyclization reaction of alkenyl benzenes to be carried out either by a method in which the solid phosphoric acid catalyst is packed in a fixed bed type reaction tube or by a method in which the catalyst is suspended in the reaction mixture, the reaction can be carried out much more advantageously by the latter method. In the case where the reaction is carried out by suspending the catalyst in the reaction mixture, the trouble due to the catalyst particles becoming smaller, a phenomenon which tends to occur in the case of the fixed bed reaction, can be avoided and, in addition, there is the advantage that the efficiency per unit weight of the catalyst is great.

When the method in which the reaction is carried out by suspending the solid phosphoric acid catalyst in the reaction mixture is employed, the catalyst is suspended in the reaction mixture by one of the following procedures, for instance:

(1) Suspension is effected by mechanical agitation;
(2) The reaction mixture is caused to flow upwardly from the bottom; or
(3) The catalyst is suspended by blowing an inert gas into the reaction mixture.

In these methods, the suspended catalyst withdrawn externally of the reaction system along with the reaction mixture is separated from the reaction mixture and again used in the reaction, as required.

When the cyclization reaction of the alkenyl benzenes is carried out in the liquid state using a fixed bed type reaction tube, the yield of the intended product varies depending upon the superficial velocity of the starting alkenyl benzenes. For obtaining the intended product more advantageously, this velocity of at least 0.001 cm./sec., and preferably at least 0.01 cm./sec., is used. When the superficial velocity is too small, the formation of high boiling products due to chiefly the alkylation reaction between the molecules increases, with the consequence that the yield suffers.

Next, the mode of reaction in which the starting material is used in the gaseous state will be described.

According to the invention process, alkyl Tetralins can be obtained by contacting the alkenyl benzenes in their gaseous state with the solid phosphoric acid catalyst. In this reaction a temperature of 180–350° C., preferably 200–350° C., and still more preferably 200–315° C., is used. The cyclization reaction proceeds even when the alkenyl benzenes are contacted with the solid phosphoric acid catalyst in their gaseous state at temperatures of less than 180° C., but for obtaining the intended product in good yield, the reaction must be carried out at the hereinbefore specified temperatures. On the other hand, when the reaction temperature exceeds 350° C., side reactions of the starting alkenyl benzenes and the intended alkyl Tetralins increase to bring about a reduction in the yield of the intended product.

When the reaction of the alkenyl benzenes is carried out in the gaseous state in the invention process, a carrier gas need not be used, but by the use of a carrier gas, i.e., by carrying out the reaction in the presence of an inert gas, the intended product can be obtained at better yields.

As the carrier gas to be used in this case, an inorganic or organic compound which is inert to the cyclization reaction and has a boiling point lower than the aklenyl benzenes is preferred from the standpoint of its recovery and for increasing the yield of the intended product. Specific examples of carrier gases conveniently usable include such as hydrogen, nitrogen, carbon dioxide, methane, ethane, propane, butane, pentane, cyclopentane, hexane, methyl cyclopentane, cyclohexane, benzene, toluene and xylene. These carrier gases are used in an amount of 0.05–100 mols, preferably 0.1–10 mols, and especially 0.5–5 mols, per mol of the starting material. When the amount used of the carrier gas is less than the aforesaid range, there is a tendency to an increase in the occurrence of side reactions of the alkyl Tetralins formed by the cyclization reaction and the formation of high boiling products. On the other hand, the use of the carrier gas in an amount in excess of the foregoing range is also undesirable, since there is a possibility of decline in the rate of conversion.

When the cyclization reaction is carried out in the invention process with the alkenyl benzenes in their gaseous state, the amount of catalyst used with the starting alkenyl benzenes will vary depending upon the particle size of the solid phosphoric acid catalyst, the amount being such that the F value ranges from 0.04 mm. hr.$^{-1}$ to 200 mm. hr.$^{-1}$. The catalyst is used in an amount coming within the foregoing range for the same reason as in the case where the reaction is carried out with the alkenyl benzenes in the liquid state. The use of the catalyst in an amount such that the F value ranges between 0.2 mm. hr.$^{-1}$ and 30 mm. hr.$^{-1}$ at a reaction temperature of 200–350° C. is especially desirable in the present invention. When the catalyst is used in an amount coming within the foregoing range, the intended alkyl Tetralins can also be obtained in good yield by the single-pass operation.

In carrying out the cyclization reaction, a small amount of water can be added to the catalyst, as required, for prolonging the life of the catalyst. In accomplishing this, the water may be mixed with the starting alkenyl benzene prior to the introduction of the alkenyl benzene to the reactor, or a method may be employed in which the feed of the starting alkenyl benzene is suspended and the catalyst is treated with steam.

The following examples will be given for more fully illustrating the invention.

Examples 1–8 and Controls 1–2

Instances in which the reactions were carried out with the starting materials in the liquid state will be illustrated. A stainless steel reaction tube 7 mm. in diameter and 100 mm. long was packed with 20 grams of a solid phosphoric acid catalyst of particle diameter 0.8 mm. and having a $P_2O_5$ content of 60% (diatomaceous earth as the carrier). While heating this catalyst layer at 220° C., the alkenyl benzene was introduced from the bottom of the reaction tube at the rate of 20 grams per hour, and the reaction mixture was withdrawn from the top of the reaction tube.

As controls, the experiment was also carried out using, instead of the solid phosphoric acid catalyst, silica-alumina ($SiO_2:Al_2O_3=87:13$) (Control 1) and silica-magnesia ($SiO_2:MgO=70:30$) (Control 2).

The analysis was conducted by means of gas chromatography.

The results obtained are shown summarized in Table I.

The rates of conversion, selectivity and yield, as used in the invention process, are defined as follows:

$$\text{Conversion} = \frac{\text{[Alkenyl benzene fed (mols)} - \text{unreacted alkenyl benzene (mols)]}}{\text{alkenyl benzene fed (mols)}} \times 100$$

$$\text{Selectivity} = \frac{\text{Intended alkyl Tetralin formed (mols)}}{\text{[alkenyl benzene fed (mols)} - \text{unreacted alkenyl benzene (mols)]}} \times 100$$

$$\text{Yield} = \frac{\text{Intended alkyl Tetralin formed (mols)}}{\text{alkenyl benzene fed (mols)}} \times 100$$

TABLE I

| | | Percent | | |
|---|---|---|---|---|
| | Starting material | Conversion | Selectivity | Yield |
| Example 1 | 5-phenyl-2-pentene | 99.5 | 94.5 | 94.0 |
| Example 2 | 5-(o-tolyl)-2-pentene | 99.5 | 94.8 | 94.3 |
| Example 3 | 5-(p-tolyl)-2-pentene | 99.6 | 94.6 | 94.2 |
| Example 4 | 5-(o-tolyl)-1-pentene | 99.6 | 95.0 | 94.6 |
| Example 5 | 5-methyl-5-phenyl-2-pentene | 99.5 | 94.0 | 93.5 |
| Example 6 | 6-methyl-6-phenyl-3-hexene | 99.5 | 94.7 | 94.2 |
| Example 7 | 6-methyl-6-phenyl-2-hexene | 99.7 | 94.6 | 94.3 |
| Example 8 | 5-methyl-5-(o-ethylphenyl)-2-pentene | 99.7 | 94.8 | 94.5 |
| Control 1 | 5-(o-tclyl)-2-pentene | 95.6 | 75.3 | 72.0 |
| Control 2 | 5-(o-tolyl)-2-pentene | 3.5 | 80.0 | 2.8 |

Examples 9–12 and Controls 3–4

The reactions were carried out using 5-(o-tolyl)-2-pentene as the starting material, the starting material being used in its liquid state and the reaction temperature being varied. Otherwise, the cyclization reaction of 5-(o-tolyl)-2-pentene was carried out exactly as in Example 2, with the results shown in Table II.

TABLE II

| | Reaction temperature, °C. | Percent | | |
|---|---|---|---|---|
| | | Conversion | Selectivity | Yield |
| Control 3 | 170 | 15.0 | 90.2 | 13.5 |
| Example 9 | 190 | 70.5 | 94.5 | 66.6 |
| Example 10 | 250 | 99.6 | 94.3 | 93.9 |
| Example 11 | 280 | 99.8 | 94.0 | 93.8 |
| Example 12 | 310 | 99.8 | 92.0 | 91.8 |
| Control 4 | 370 | 99.9 | 88.5 | 88.4 |

Examples 13–21

The reactions were carried out using the starting alkenyl benzenes in their liquid state and varying the F value.

A reaction tube having a tube diameter of 11 mm. and length of 1400 mm. was packed with 80 grams of a solid phosphoric acid catalyst of particle diameter 3 mm. and having a $P_2O_5$ content of 55% (acid clay as the carrier). The catalyst layer was was then heated at 220° C., and the reaction was carried out while varying the rate at which the 5-(o-tolyl)-2-pentene was fed. The results obtained are shown in Table III.

TABLE III

| | F value | Percent | | |
|---|---|---|---|---|
| | | Conversion | Selectivity | Yield |
| Example 13 | 0.15 | 99.9 | 93.0 | 91.9 |
| Example 14 | 0.30 | 99.9 | 93.0 | 92.9 |
| Example 15 | 0.50 | 99.8 | 93.2 | 93.0 |
| Example 16 | 1.0 | 99.7 | 93.8 | 93.5 |
| Example 17 | 4.0 | 99.5 | 94.5 | 94.0 |
| Example 18 | 10.0 | 99.0 | 94.5 | 93.6 |
| Example 19 | 15.0 | 96.5 | 94.5 | 91.2 |
| Example 20 | 25.0 | 90.0 | 94.5 | 85.9 |
| Example 21 | 50.0 | 50.0 | 94.6 | 47.3 |

Examples 22–29 and Controls 5–6

The results obtained when the reactions were carried out using the starting material in the gaseous state will be shown.

A reaction tube having a diameter of 10 mm. and length of 1600 mm. was packed with 80 grams of a solid phosphoric acid catalyst of particle diameter 3 mm. and a $P_2O_5$ content of 60% (silica gel as the carrier). The catalyst layer was heated at 240° C., and the alkenyl benzene was introduced from the top of the reaction tube at the rate of 40 grams per hour. At the same time a carrier gas was introduced. The reaction mixture was cooled at the bottom of the reaction tube and then collected.

As controls, the experiment was also carried out using, instead of the solid phosphoric acid catalyst, silica-alumina ($SiO_2:Al_2O_3=87:13$) (Control 5) and silica-magnesia (SiO$_2$:MgO=70:30) (Control 6). The results obtained are shown together in Table IV.

TABLE IV

| | Starting material | Carrier gas | | Percent | | |
|---|---|---|---|---|---|---|
| | | Kind | L./hr. | Conversion | Selectivity | Yield |
| Example 22 | 5-phenyl-2-pentene | N$_2$ | 6 | 99.8 | 93.8 | 93.6 |
| Example 23 | 5-(o-tolyl)-2-pentene | N$_2$ | 6 | 99.9 | 94.0 | 93.9 |
| Example 24 | 5-(p-tolyl)-2-pentene | H$_2$ | 5 | 99.9 | 93.2 | 93.1 |
| Example 25 | 5-(o-tolyl)-1-pentene | H$_2$ | 5 | 99.8 | 94.0 | 93.8 |
| Example 26 | 5-methyl-5-phenyl-2-pentene | CO$_2$ | 6 | 99.9 | 93.5 | 93.4 |
| Example 27 | 6-methyl-6-phenyl-3-hexene | CH$_4$ | 6 | 99.8 | 93.8 | 93.6 |
| Example 28 | 5-methyl-5-(p-ethylphenyl)-2-hexene | C$_2$H$_6$ | 8 | 99.7 | 94.0 | 93.7 |
| Example 29 | 6-phenyl-2-hexene | H$_2$ | 3 | 99.9 | 94.5 | 94.4 |
| Control 5 | 5-(o-tolyl)-2-pentene | H$_2$ | 6 | 95.3 | 80.3 | 76.5 |
| Control 6 | 5-(o-tolyl)-2-pentene | H$_2$ | 6 | 2.5 | 75.2 | 1.9 |

Examples 30–36 and Controls 7–9

The cyclization reaction of 5-(o-tolyl)-2-pentene was carried out with the starting material in a gaseous state while varying the reaction temperature.

A reaction tube of a diameter 10 mm. was packed with a prescribed amount of a solid phosphoric acid catalyst of a particle diameter 3 mm. and a P$_2$O$_5$ content of 60% (bentonite as the carrier). The catalyst layer was then heated at a prescribed temperature, and 80 grams per hour of 5-(o-tolyl)-2-pentene was fed from the top of the reaction tube, while the reaction was withdrawn from the bottom of the tube. As carrier gas, nitrogen was used in the reaction, as required. The results obtained are shown in Table V.

TABLE V

| | Amount of catalyst (g.) | Nitrogen/ alkylenyl benzene (mol ratio) | Reaction temperature (° C.) | Percent | | |
|---|---|---|---|---|---|---|
| | | | | Conversion | Selectivity | Yield |
| Control 7 | 320 | 7.0 | 170 | 25.0 | 90.5 | 22.6 |
| Example 30 | 200 | 4.0 | 190 | 75.3 | 93.5 | 70.4 |
| Example 31 | 120 | 2.0 | 220 | 99.0 | 94.0 | 93.1 |
| Example 32 | 80 | 1.0 | 250 | 99.9 | 94.5 | 94.4 |
| Example 33 | 80 | 1.0 | 300 | 99.9 | 93.0 | 92.9 |
| Example 34 | 80 | 1.0 | 340 | 99.9 | 92.8 | 92.7 |
| Control 8 | 80 | 1.0 | 370 | 99.9 | 88.5 | 88.4 |
| Example 35 | 80 | 0 | 250 | 99.8 | 92.8 | 92.6 |
| Example 36 | 80 | 0 | 300 | 99.9 | 92.2 | 92.1 |
| Control 9 | 80 | 0 | 370 | 99.9 | 86.5 | 86.4 |

Examples 37–42

The results obtained when the reaction was carried out by varying the F value in cyclizing 5-(p-tolyl)-2-pentene in the gaseous state will be shown.

A reaction tube 10 mm. in diameter and 1600 mm. in length was packed with 80 grams of a solid phosphoric acid catalyst of a particle diameter 5 mm. and a P$_2$O$_5$ content of 50% (diatomaceous earth as the carrier). The catalyst layer was heated at 245° C., and the reaction was carried out while varying the rate at which the 5-(p-tolyl)-2-pentene was fed. The results obtained are shown in Table VI. In this experiment, H$_2$ was used as the carrier gas in ½ molar quantity of the 5-(p-tolyl)-2-pentene.

TABLE VI

| | F value | Percent | | |
|---|---|---|---|---|
| | | Conversion | Selectivity | Yield |
| Example 37 | 0.15 | 99.9 | 92.6 | 92.5 |
| Example 38 | 0.50 | 99.8 | 93.0 | 92.8 |
| Example 39 | 2.0 | 99.8 | 93.5 | 93.3 |
| Example 40 | 10.0 | 93.5 | 94.6 | 88.5 |
| Example 41 | 15.0 | 86.8 | 94.6 | 82.1 |
| Example 42 | 40.0 | 56.0 | 94.7 | 53. |

Examples 43–46

The results obtained when the cyclization reaction of 5-methyl-5-phenyl-2-pentene was carried out with the starting material in the liquid state while varying the superficial velocity will be shown.

A reaction tube having a tube diameter of 25 mm. was packed with a prescribed amount of a solid phosphoric acid catalyst of a particle diameter of 5 mm. and a P$_2$O$_5$ content of 45% (silica gel as the carrier). The catalyst layer was heated at 230° C., and the starting 5-methyl-5-phenyl-2-pentene was fed from the bottom of the reaction tube in an amount such that the relationship "(Amount (g.) of starting material fed per hour)/ (Amount (g.) of catalyst)" would be 1.0, while the reaction product was withdrawn from the top of the reaction tube. The results obtained are shown in Table VII.

TABLE VII

| | Amount of catalyst (g.) | Superficial velocity (cm./sec.) | Percent | | |
|---|---|---|---|---|---|
| | | | Conversion | Selectivity | Yield |
| Example 43 | 9 | 0.0005 | 99.5 | 92.5 | 92.0 |
| Example 44 | 90 | 0.005 | 99.8 | 93.0 | 92.8 |
| Example 45 | 900 | 0.05 | 99.5 | 94.4 | 93.9 |
| Example 46 | 1,800 | 0.1 | 99.6 | 94.3 | 93.9 |

Example 47 and Controls 10–11

This experiment illustrates the instance where the reaction was carried out with the starting material in the liquid state and the catalyst in suspension.

Ten grams of a solid phosphoric acid catalyst of a particle diameter of 0.05 mm. and a P$_2$O$_5$ content of 60% (diatomaceous earth as the carrier) was added to 100 grams of 5-(o-tolyl)-2-pentene, after which the reaction was carried out by heating the mixture at 225–240° C. for 30 minutes with stirring. The rate of conversion of the reaction was 99.5% and the selectivity was 94.5%.

As controls, the reaction temperature was changed to 170° C. and 370° C. and the reaction time to 12 hours and 5 minutes, respectively, but the cyclization reaction was carried out otherwise as in Example 47, above. The conversions were respectively 89.5% and 99.5%, while the selectivities were 90.3% and 89.5%.

Example 48

Twenty grams of a solid phosphoric acid catalyst of particle diameters 0.08 mm. were placed in a continuous reaction apparatus, and the reaction was carried out at 220° C. This apparatus consists of a vertical type reactor equipped with a stirrer, a reflux condenser, a feed line entering its upper side and a vertical side pipe rising from the bottom of the reactor, from which vertical pipe the reaction solution is withdrawn as a result of overflowing therefrom; and the apparatus is so adapted that the catalyst particles that move by entrainment in the reaction solution settle in the vertical side pipe that leads from the bottom of the reactor and are recycled therefrom to be again used in the reactor.

The starting 5-(o-tolyl)-2-pentene was continuously fed at the rate of 100 grams per hour. The reaction solution was continuously withdrawn externally of the system via the aforesaid vertical side pipe. The average dwell time of the reaction solution in the reactor was 30 minutes. The rate of conversion was 99.1% and the selectivity was 93.5%.

We claim:
1. A process for the preparation of alkyl Tetralins which comprises effecting the cyclization of an alkenyl benzene of the formula

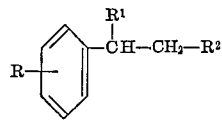

wherein R is a member selected from the group consisting of hydrogen and the alkyl groups of 1-2 carbon atoms, $R^1$ is a member selected from the group consisting of hydrogen and methyl, and $R^2$ is a member selected from the group consisting of —CH=CH—$CH_3$,

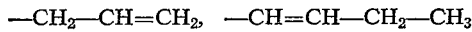

and —$CH_2$—CH=CH—$CH_3$, by contacting said alkenyl benzene with a solid phosphoric acid catalyst at a temperature of 180–350° C.

2. The process according to claim 1 wherein said alkenyl benzene is contacted with the solid phosphoric acid catalyst in its liquid state.

3. The process according to claim 2 wherein the contact of the alkenyl benzene with the solid phosphoric acid catalyst is carried out at a temperature of 180–300° C.

4. The process according to claim 2 wherein the relationship

"(Weight of alkenyl benzene fed per units operation time) × (Particle diameter of catalyst)/(Weight of catalyst)"

is maintained within the range of 0.04–200 mm. hr.$^{-1}$.

5. The process according to claim 2 which comprises carrying out the reaction by suspending the solid phosphoric acid catalyst in the reaction mixture.

6. The process according to claim 1 wherein said alkenyl benzene is contacted with the solid phosphoric acid catalyst in its gaseous state.

7. The process according to claim 6 wherein the contact of the alkenyl benzene with the solid phosphoric acid catalyst is carried out at a temperature of 200–350° C.

8. The process according to claim 6 wherein the relationship

"(Weight of alkenyl benzene fed per unit operation time) × (Particle diameter of catalyst)/(Weight of catalyst)"

is maintained within the range of 0.04–200 mm. hr.$^{-1}$.

9. The process according to claim 6 wherein the reaction is carried out in the presence of a gas that is chemically inert under the reaction conditions prevailing.

References Cited
UNITED STATES PATENTS

| | | | |
|---|---|---|---|
| 3,244,758 | 4/1966 | Eberhardt | 260—671 A |
| 2,860,173 | 11/1958 | Jones et al. | 260—671 C |
| 3,275,701 | 9/1966 | Theimer et al. | 260—668 F |
| 3,207,801 | 9/1965 | Frilette et al. | 260—668 F |

CURTIS R. DAVIS, Primary Examiner

U.S. Cl. X.R.

260—666 A